US012568448B2

(12) United States Patent
Thasari et al.

(10) Patent No.: US 12,568,448 B2
(45) Date of Patent: *Mar. 3, 2026

(54) PUCCH FORMAT 0 SIGNAL PROCESSING WITH REDUCED COMPLEXITY

(71) Applicant: RAKUTEN SYMPHONY, INC.,
Tokyo (JP)

(72) Inventors: Sri Venkata Gautham Thasari,
Bangalore (IN); Ayush Agrawal,
Bangalore (IN)

(73) Assignee: RAKUTEN SYMPHONY, INC.,
Tokyo (JP)

( * ) Notice: Subject to any disclaimer, the term of this patent is extended or adjusted under 35 U.S.C. 154(b) by 300 days.

This patent is subject to a terminal disclaimer.

(21) Appl. No.: 18/252,889

(22) PCT Filed: Jan. 24, 2023

(86) PCT No.: PCT/US2023/011402
§ 371 (c)(1),
(2) Date: May 15, 2023

(87) PCT Pub. No.: WO2024/158383
PCT Pub. Date: Aug. 2, 2024

(65) Prior Publication Data
US 2025/0071696 A1 Feb. 27, 2025

(51) Int. Cl.
*H04W 52/36* (2009.01)
*H04L 1/1829* (2023.01)
*H04L 27/26* (2006.01)

(52) U.S. Cl.
CPC ......... *H04W 52/367* (2013.01); *H04L 1/1861* (2013.01); *H04L 27/2628* (2013.01)

(58) Field of Classification Search
None
See application file for complete search history.

(56) References Cited

U.S. PATENT DOCUMENTS

| | | | |
|---|---|---|---|
| 2009/0296862 A1 | 12/2009 | Nakaya | |
| 2014/0301412 A1 | 10/2014 | Kim et al. | |
| 2020/0053624 A1* | 2/2020 | Braithwaite | ........ H04W 84/047 |
| 2020/0229177 A1* | 7/2020 | Zou | ......................... H04L 5/001 |
| 2022/0217710 A1* | 7/2022 | Luo | ...................... H04L 1/0072 |
| 2024/0048288 A1* | 2/2024 | Fakoorian | ............. H04W 72/56 |
| 2024/0349287 A1* | 10/2024 | Thasari | ............... H04W 72/542 |

* cited by examiner

*Primary Examiner* — Lester G Kincaid
(74) *Attorney, Agent, or Firm* — HAUPTMAN HAM, LLP

(57) ABSTRACT

A network device includes receiver and a processor. The receiver receives a signal from a group of terminal devices, over a physical uplink control channel (PUCCH) Format 0 (FMT0). The processor is coupled to the receiver, performs processing on the received signal to detect payloads corresponding to the terminal devices in the group, and utilizes the detected payloads for handling further communications with the terminal devices in the group. In the processing, the processor obtains a time domain sequence from the received signal by performing a transform from a frequency domain into a time domain, determines a plurality of correlation power values from the time domain sequence, and extracts, from the plurality of correlation power values, a maximum correlation power value corresponding to each terminal device among the terminal devices in the group.

20 Claims, 6 Drawing Sheets

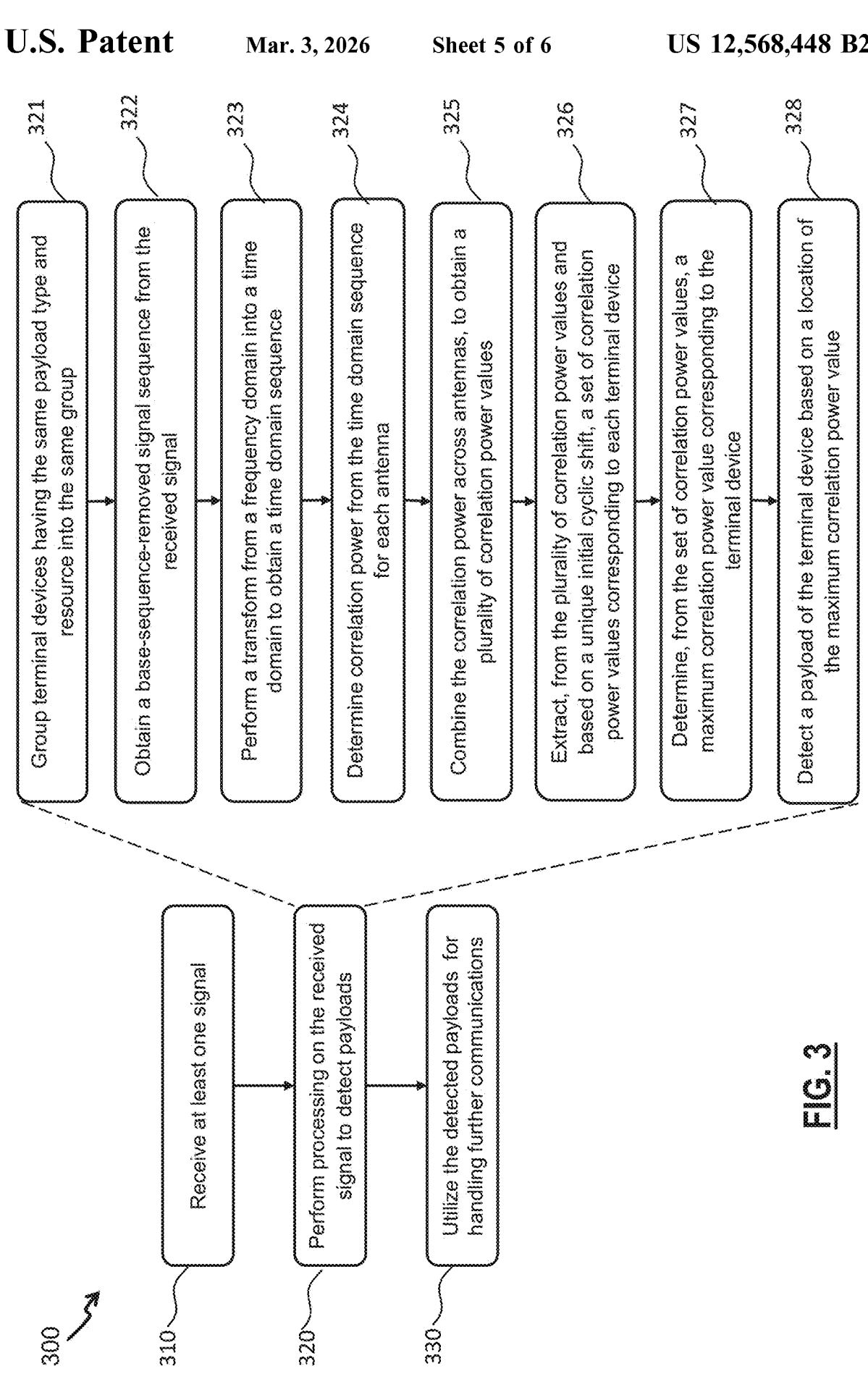

321 Group terminal devices having the same payload type and resource into the same group 322 Obtain a base-sequence-removed signal sequence from the received signal 323 Perform a transform from a frequency domain into a time domain to obtain a time domain sequence 324 Determine correlation power from the time domain sequence for each antenna 325 Combine the correlation power across antennas, to obtain a plurality of correlation power values 326 Extract, from the plurality of correlation power values and based on a unique initial cyclic shift, a set of correlation power values corresponding to each terminal device 327 Determine, from the set of correlation power values, a maximum correlation power value corresponding to the terminal device 328 Detect a payload of the terminal device based on a location of the maximum correlation power value

300

310 Receive at least one signal

320 Perform processing on the received signal to detect payloads

330 Utilize the detected payloads for handling further communications

FIG. 3

PUCCH FORMAT 0 SIGNAL PROCESSING WITH REDUCED COMPLEXITY

RELATED APPLICATIONS

The present application is a National Phase of International Application No. PCT/US2023/011402, filed Jan. 24, 2023.

TECHNICAL FIELD

The present disclosure is related to physical uplink control channel (PUCCH) Format 0 (FMT0) signal processing with reduced complexity.

BACKGROUND

In wireless communication systems, user equipment (UE) communicates with a network node (e.g., a base station, or the like) to receive data on one or more downlink channels. The UE sends signaling to the network node on one or more uplink channels. For example, the uplink signaling from the UE to the network node includes a hybrid automatic repeat request (HARQ) acknowledgment (ACK), or negative acknowledgement (NACK), for the downlink data. Other signaling includes reports, scheduling requests, or the like. The uplink signaling is transmitted, for example, over a physical uplink control channel (PUCCH). There are various PUCCH formats, e.g., Format 0 (FMT0), Format 1, Format 2, Format 3, Format 4, or the like. Each PUCCH format is configured for a specific type of signaling and/or purposes.

SUMMARY

In other approaches, processing of PUCCH FMT0 signals on the receiving side, e.g., at a network node, is performed in the frequency domain. Each UE requires the network node to employ a number of correlations for PUCCH FMT0 signal processing. When multiple UEs are multiplexed on the same communications resource, these correlations increase, e.g., linearly, with the number of UEs. As a result, when the number of multiplexed UEs increases, processing of PUCCH FMT0 signals at the receiving side may become highly complex and may consume an excessive amount of time, computing power/resources, or the like. The complexity and/or time/resource consumption of PUCCH FMT0 signal processing contribute(s) to one or more further undesirable consequences.

In some embodiments, processing of PUCCH FMT0 signals at a network device is performed in the time domain. As a result, in one or more embodiments, it is possible to perform one or more operations collectively for multiple UEs, while processing PUCCH FMT0 signals. In at least one embodiment, the complexity and/or time/resource consumption of PUCCH FMT0 signal processing is/are reduced which, in turn, help in increasing network performance, especially when multiple UEs are multiplexed on the same communications resource.

In some embodiments, a network device comprises receiver circuitry and a processor. The receiver circuitry is configured to receive a signal from a group of terminal devices, over a physical uplink control channel (PUCCH) Format 0 (FMT0). The processor is coupled to the receiver circuitry. The processor is configured to perform processing on the received signal to detect payloads corresponding to the terminal devices in the group, and utilize the detected payloads for handling further communications with the terminal devices in the group. In the processing, the processor is configured to obtain a time domain sequence from the received signal by performing a transform from a frequency domain into a time domain. The processor is further configured to determine a plurality of correlation power values from the time domain sequence, and extract, from the plurality of correlation power values, a maximum correlation power value corresponding to each terminal device among the terminal devices in the group.

In some embodiments, a non-transitory, tangible computer readable storage medium stores a computer program. The program, when executed by a processor, causes the processor to perform an Inverse Discrete Fourier Transform (IDFT) transform to obtain a time domain sequence from each received signal among a plurality of received signals. The plurality of signals is correspondingly received at a plurality of antennas from a group of terminal devices over a physical uplink control channel (PUCCH) Format 0 (FMT0). The processor is further caused to determine a plurality of correlation power values from the time domain sequence. For each terminal device in the group of terminal devices, the processor is further caused to extract from the plurality of correlation power values a maximum correlation power value corresponding to the terminal device, detect a payload of the terminal device based on an index corresponding to the maximum correlation power value, and utilize the detected payload for handling further communications with the terminal device.

In some embodiments, a method performed at least in part by a processor comprises grouping of a plurality of terminal devices into a plurality of groups each including terminal devices of a same payload type among a plurality of payload types of a physical uplink control channel (PUCCH) Format 0 (FMT0). The method further comprises performing a transform from a frequency domain into a time domain to obtain a time domain sequence from each received signal among a plurality of received signals correspondingly received at a plurality of antennas from the group of terminal devices over the PUCCH FMT0. The method further comprises determining correlation power from the time domain sequence corresponding to each antenna among the plurality of antennas. The method further comprises combining the correlation power across the plurality of antennas, to obtain a plurality of correlation power values. The method further comprises, for each terminal device in each group among the plurality of groups, extracting, from the plurality of correlation power values and based on an initial cyclic shift that is unique to the terminal device, a set of correlation power values corresponding to the terminal device, determining, from the set of correlation power values, a maximum correlation power value corresponding to the terminal device, detecting a payload of the terminal device based on an index corresponding to the maximum correlation power value, and utilizing the detected payload for handling further communications with the terminal device.

BRIEF DESCRIPTION OF THE DRAWINGS

Aspects of the present disclosure are best understood from the following detailed description when read with the accompanying figures In accordance with the standard practice in the industry, various features are not drawn to scale. In fact, the dimensions of the various features be arbitrarily increased or reduced for clarity of discussion.

FIG. 3 is a flow chart of a method, in accordance with some embodiments.

DETAILED DESCRIPTION

Figure 1B:
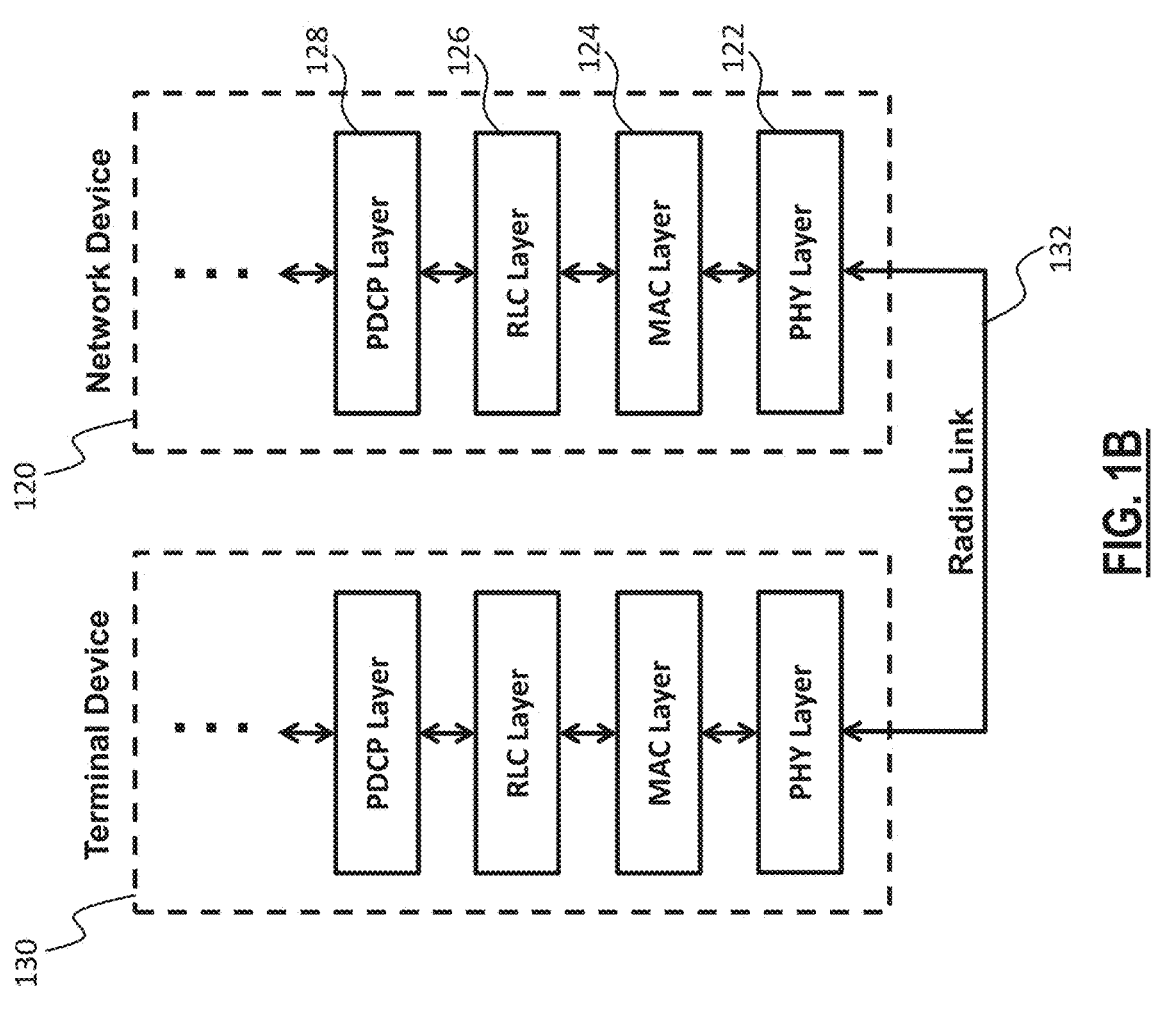
FIG. 1B is a schematic diagram of an example of a protocol stack for communications between a network device and a terminal device, in accordance with some embodiments.

The following disclosure includes many different embodiments, or examples, for implementing different features of the subject matter. Specific examples of components, values, operations, materials, arrangements, or the like, are described below to simplify the present disclosure. These are, of course, merely examples and are not intended to be limiting. Other components, values, operations, materials, arrangements, or the like, are contemplated. For example, the formation of a first feature over or on a second feature in the description that follows include embodiments in which the first and second features are formed in direct contact, and also include embodiments in which additional features be formed between the first and second features, such that the first and second features not be in direct contact. In addition, the present disclosure repeats reference numerals and/or letters in the various examples. This repetition is for the purpose of simplicity and clarity and does not in itself dictate a relationship between the various embodiments and/or configurations discussed. Further, spatially relative terms, such as "beneath," "below," "lower," "above," "upper" and the like, be usable herein for ease of description to describe one element or feature's relationship to another element(s) or feature(s) as illustrated in the figures. The spatially relative terms are intended to encompass different orientations of the device in use or operation in addition to the orientation depicted in the figures. The apparatus be otherwise oriented (rotated 90 degrees or at other orientations) and the spatially relative descriptors.

Figure 1A:
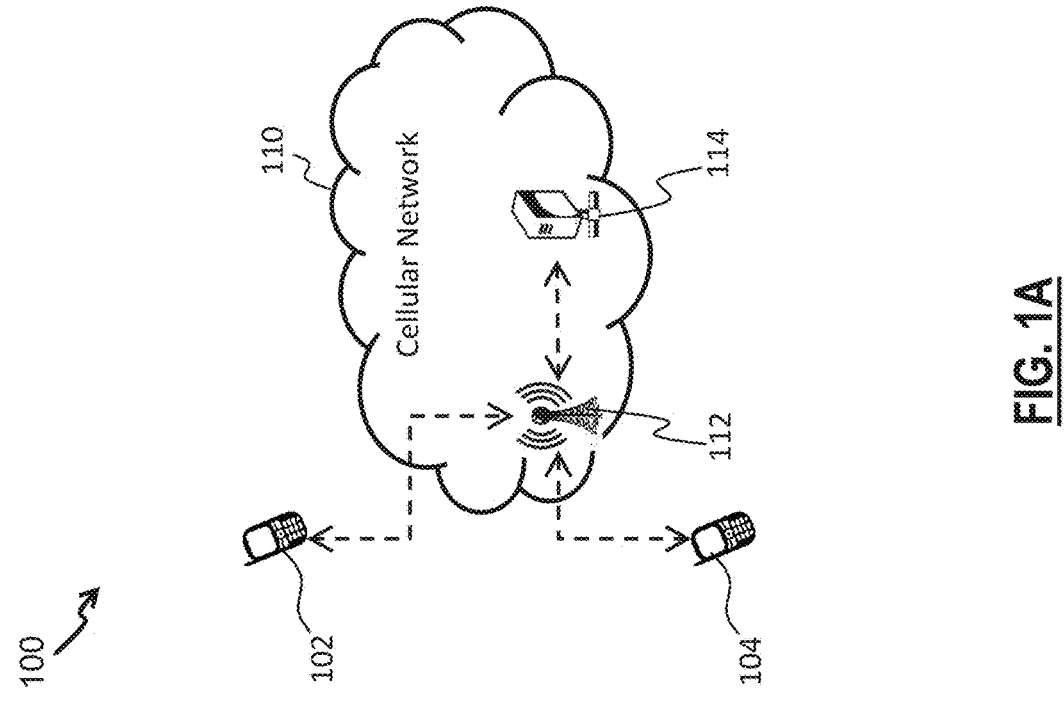
FIG. 1A is a schematic diagram of an example communications system, in accordance with some embodiments.

FIG. 1A is a schematic diagram of an example communications system 100, in accordance with some embodiments.

In the example configuration of the communications system 100 in FIG. 1A, terminal devices 102, 104 are coupled to a cellular network 110 to receive communication services. In an example, the cellular network 110 comprises a plurality of cells (not shown) in which cellular services are provided through corresponding network devices, such as base stations, access nodes (or access points), or the like. A representative base station 112 is illustrated in FIG. 1A. The base stations and/or access nodes constitute a radio access network, and are coupled to a core network of the cellular network 110. A representative core network component 114 of the core network is illustrated in FIG. 1A. In some embodiments, a terminal device accesses the communications system 100 to obtain a service of an external network (for example, a data network) or to communicate with another terminal device. In the communications system 100, the radio access network, including base stations and/or access nodes, is configured to permit access by the terminal device to the communications system 100, whereas the core network, including core network components, is configured to manage the terminal device and provide a gateway for communicating with the data network.

Examples of the cellular network 110 include, but are not limited to, a long term evolution (LTE) network, a fifth generation (5G) network, a sixth generation (6G) network, a non-standalone (NSA) network, a standalone (SA) network, a global system for mobile communications (GSM) network, a general packet radio service (GPRS) network, a code-division multiple access (CDMA) network, a Mobitex network, an enhanced GPRS (EDGE) cellular network, a Wi-Fi (or WIFI) network, a WIMAX network, or the like. Examples of services provided over cellular communication, herein referred to as cellular communication services, include, but are not limited to, voice calls, data, emails, messages such as SMS and MMS, applications, and control signals.

In some embodiments, a terminal device is configured to provide a user with voice and/or data connectivity. A terminal device is configured to communicate with the core network through the radio access network of the communications system 100, and to exchange voice and/or data with the radio access network. Examples of terminal devices include, but are not limited to, user equipment (UE), device-to-device (D2D) communication equipment, vehicle-to-everything (V2X) communication equipment, machine-to-machine/machine type communication (M2M/MTC) communication equipment, internet of things (IoT) communication equipment, cell phones, tablets, media players, gaming consoles, personal data assistants (PDAs), laptops, other electronic devices configured to transmit and/or receive cellular communication to/from network devices of the cellular network 110, or the like. An example hardware configuration of a terminal device is described with respect to FIG. 4.

In some embodiments, a network device is any device that is configured to communicate with a terminal device over an air interface or radio link which employs PUCCH FMT0 signals as described herein. In some embodiments, a network device is configured to enable a terminal device to access the radio access network. Examples of network devices include, but are not limited to, next generation NodeB (gNB) in a 5G communications system, evolved NodeB (eNB), radio access network controllers (RNC), NodeB (NB), network device controllers (BSC), base transceiver stations or base stations (BTS), home network devices such as home evolved NodeB and/or home NodeB, baseband unit (BBU) communication equipment, transmission reception points (TRP), transmitting points (TP), or the like. In an example configuration, a network devices include one or more cellular antennas, one or more sets of transmitter/receivers (transceivers), digital signal processors, control electronics, a Global Positioning System (GPS) receiver for timing (e.g., for CDMA2000/IS-95 or GSM systems), or the like. In some embodiments, a network device comprises one or more hardware components on/by which software corresponding to various algorithms and/or operations described here is executed. An example hardware configuration of a network device is described with respect to FIG. 4.

Examples of core network components of the core network include, but are not limited to, serving gateways (SGW), high rate packet data serving gateway (HSGW), packet data network gateway (PGW), packet data serving node (PDSN), mobility management entity (MME), home subscriber server (HSS), and policy control rules function (PCRF). The core network components of the core network are coupled with each other and with the network devices by one or more public and/or proprietary networks. An example hardware configuration of a core network component of the core network is described with respect to FIG. 4, but without cellular transceiving circuitry and associated antennas. Other hardware configurations for a terminal device, a network device, or a core network component are within the scopes of various embodiments.

FIG. 1B is a schematic diagram of an example of a protocol stack for communications between a network device 120 and a terminal device 130, in accordance with some embodiments. For example, the network device 120 corresponds to one or more network devices in the communications system 100, and the terminal device 130 corresponds to one or more of the terminal devices 102, 104.

In the example configuration in FIG. 1B, communications between the network device 120 and the terminal device 130 comply with a protocol stack including, for the network device 120, a physical layer (PHY layer) 122, a media access control layer (MAC layer) 124, a radio link control layer (RLC layer) 126, a packet data convergence protocol layer (PDCP layer) 128, or the like. The terminal device 130 similarly includes a corresponding protocol stack including PHY layer, a MAC layer, an RLC layer, a PDCP layer, or the like. For simplicity, the protocol layers in the terminal device 130 are not numbered. In the protocol stack, the MAC layer is a higher layer than the PHY layer, the RLC layer is a higher layer than the MAC layer, and so on. With respect to the PHY layer, higher layers in the protocol stack include the MAC layer, the RLC layer, the PDCP layer, and any other layer(s) above the PDCP layer.

In a control plane, control-relevant information is exchanged between the network device 120 and the terminal device 130. For example, the establishment and/or management of communication sessions between the network device 120 and terminal device 130 occur(s) at a top layer on the control plane referred to as non-access stratum (NAS) (not shown). A radio resource control (RRC) layer is between the NAS and the PDCP layer, and is configured to set various parameters for the communication sessions.

In a user plane, data is exchanged between the network device 120 and the terminal device 130. A top layer on the user plane includes an application layer (not shown), followed by a lower Internet Protocol (IP) layer (not shown). A service data adaptation protocol (SDAP) layer (not shown) is between the IP layer and the PDCP layer, and is configured, e.g., for quality of service (QOS) management.

Communications between the network device 120 and the terminal device 130 include downlink communications from the network device 120 to the terminal device 130, and uplink communications from the terminal device 130 to the network device 120. In an example downlink communication, upon obtaining data from an upper (or higher) layer, the PDCP layer 128 transmits the data to the RLC layer 126 and the MAC layer 124, the MAC layer 124 generates a transport block, and then wireless communications are performed through the physical layer 122, via a radio link (or air interface) 132 between antennas of the network device 120 and the terminal device 130. Data flow between the RLC layer, MAC layer, and PHY layer through channels. For example, logical channels are between the RLC layer 126 and the MAC layer 124 and are configured to define the type of data to be transferred. Transport channels are between the MAC layer 124 and the PHY layer 122, and are configured to define how data are carried to the PHY layer 122 and characteristics of the data. The PHY layers of the network device 120 and the terminal device 130 communicate with each other through physical channels with characteristics such as timing, access protocols, data rates, modulation, beamforming, or the like. At the terminal device 130, data received from the network device 120 are transferred from the PHY layer sequentially through the MAC layer, the RLC layer, the PDCP layer to one or more higher layers. Uplink communications occur in the reversed order to that described with respect to downlink communications.

Examples of uplink physical channels include physical uplink shared channel (PUSCH), physical random access channel (PRACH), and physical uplink control channel (PUCCH). PUSCH is configured to carry RRC signaling messages, uplink control information (UCI), and application data. PRACH is configured to carry random access preambles for initiation of random access procedure. PUCCH has various formats. For example, PUCCH Format 0 (FMT0) is configured for relatively short duration PUCCH, with relatively small UCI payloads, e.g., of up to two bits. The UCI payloads pertain to scheduling requests and/or hybrid automatic repeat requests (hybrid ARQ or HARQ), with UE multiplexing in the same physical resource block (PRB). PUCCH Format 1 is configured for relatively long duration PUCCH, and is configured to carry UCI pertaining to scheduling requests and HARQ, with UE multiplexing in the same PRB. PUCCH Format 2 is configured for relatively short duration PUCCH, with relatively large UCI payloads, e.g., of more than two bits, and is configured to carry UCI pertaining to channel quality indicators (CQI) and HARQ, without UE multiplexing in the same PRB. PUCCH Format 3 is configured for relatively long duration PUCCH, with relatively large UCI payloads, and is configured to carry UCI pertaining to scheduling requests and HARQ, without UE multiplexing in the same PRB. PUCCH format 4 is configured for relatively long duration PUCCH, with relatively moderate UCI payloads, and UE multiplexing capacity in the same PRB. Other PUCCH formats are available.

Some embodiments are applicable to PUCCH FMT0, as described in the $3^{rd}$ Generation Partnership Project (3GPP), at the following sections:

Technical Specification (TS) 38.211, at
  6.3.2.1 General,
  6.3.2.2 Sequence and cyclic shift hopping,
  6.3.2.2.1 Group and sequence hopping,
  6.3.2.3.2 Cyclic shift hopping,
  6.3.2.3 PUCCH Format 0,
  6.3.2.3.1 Sequence generation,
  6.3.2.3.2 Mapping to physical resources, and
TS 38.213, at
  9.2.2 PUCCH formats for UCI transmission.

Figure 2A:
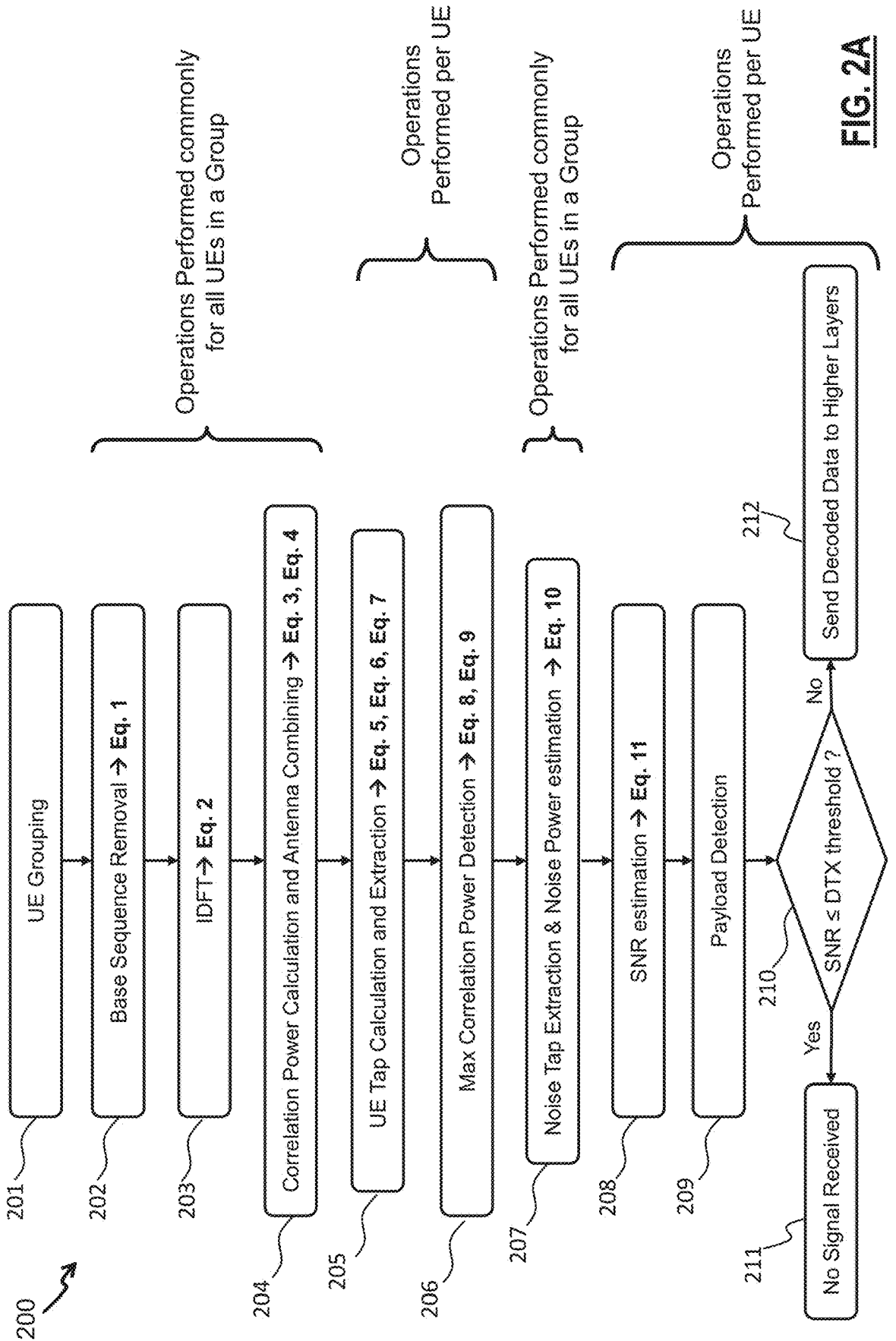
FIG. 2A is a flow chart of a process.
Figure 2B:
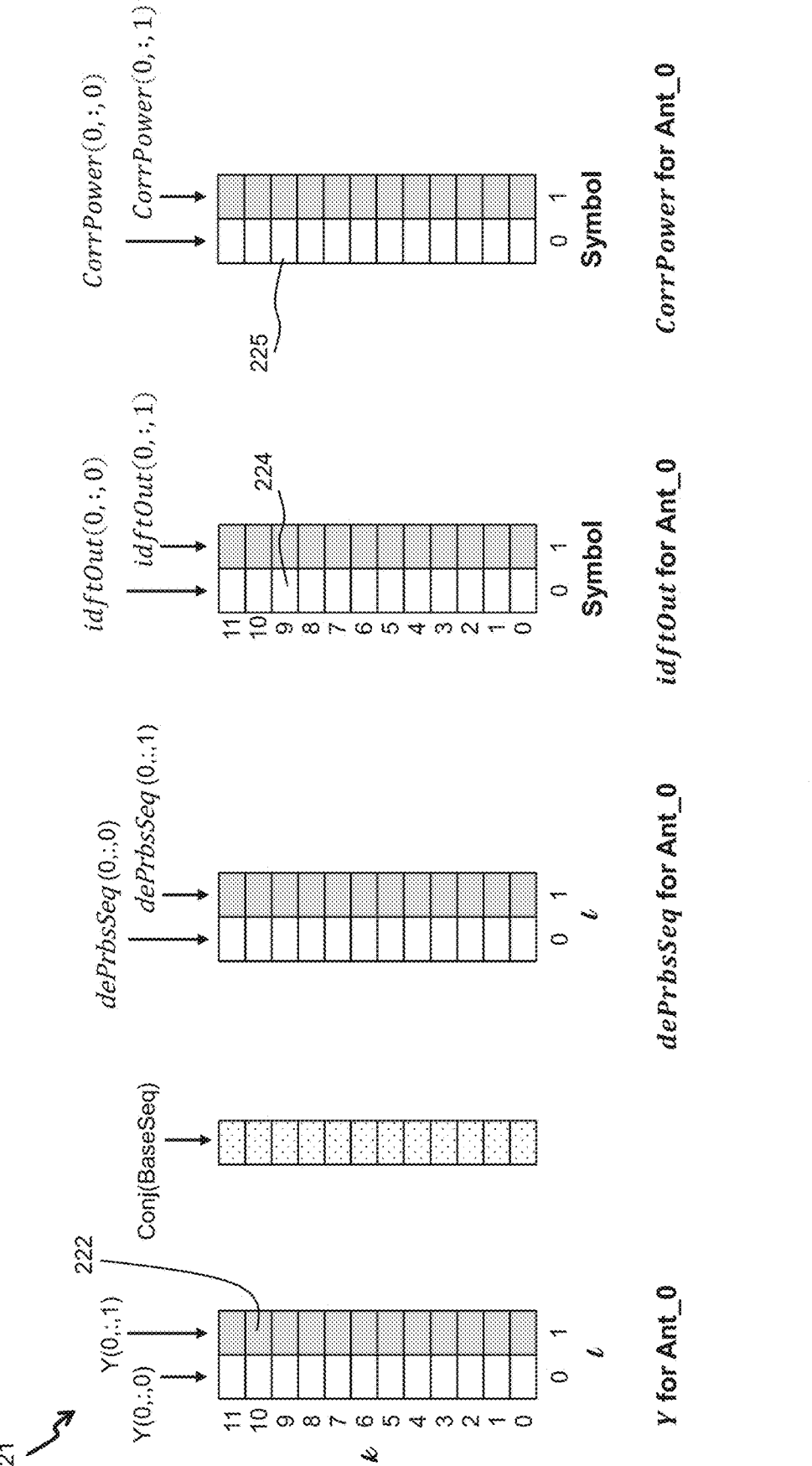
FIGS. 2B-2C are schematic diagrams showing signals and/or data at various stages of the process, in accordance with some embodiments.
Figure 2C:
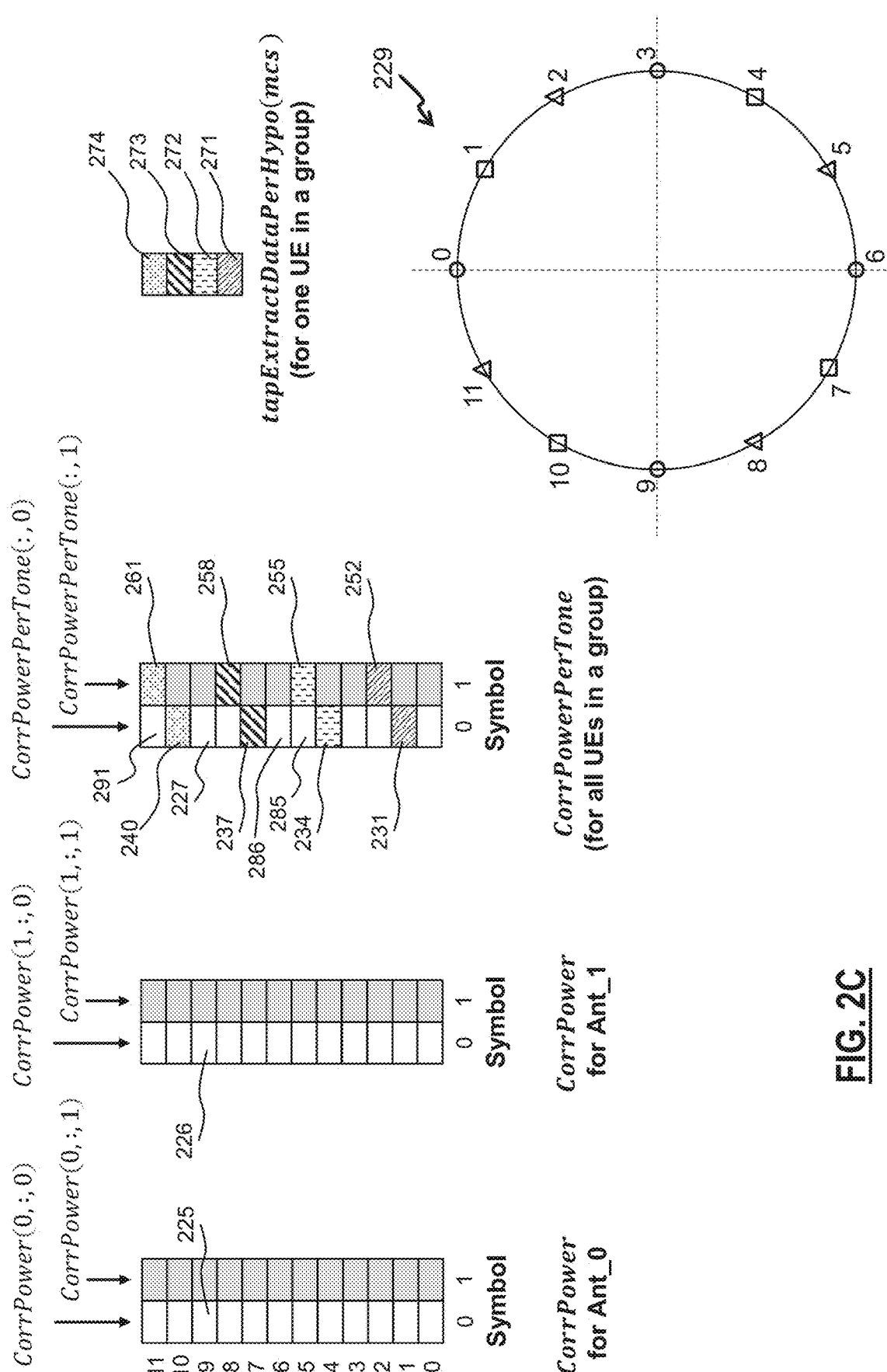

FIG. 2A is a flow chart of a process 200, and FIGS. 2B-2C are schematic diagrams showing signals and/or data at various stages of the process 200, in accordance with some embodiments. A description of the process 200 in one or more embodiments is provided herein with reference to FIGS. 2A-2C. In some embodiments, operations described with respect to FIGS. 2A-2C are performed by at least one processor and/or at a network device.

The process 200 is configured to process a signal received, over a physical uplink control channel (PUCCH) Format 0 (FMT0), at one or more antennas of a network device. The received signal includes data and/or signaling from multiple terminal devices which are multiplexed on the same communications resource. In some embodiments, the network device corresponds to the base station 112 and/or the network device 120. In some embodiments, the terminal devices correspond to the terminal devices 102, 104 and/or the terminal device 130. For simplicity, a terminal device is referred to in the below description as UE, and vice versa.

In some embodiments, a network device comprises a plurality of antennas, and the network device receives a plurality of received signals each at a corresponding antenna among the plurality of antennas of the network device. Each of the plurality of received signals includes data and/or signaling from multiple UEs which are multiplexed on the same communications resource. Herein, unless otherwise specified, "multiplexed UEs" and simply "UEs" refer to UEs which are multiplexed on the same communications resource. For simplicity, the processing of a received signal at one antenna of the network device is described in detail herein with respect to some embodiments. The processing is similarly performed for other received signals at the corresponding other antennas of the network device.

Referring to FIG. 2B, a received signal Y at antenna Ant_0 of the network device is schematically represented in a resource grid 221. The resource grid 221 comprises a plurality of resource elements (k, l), where k is a frequency index in the frequency domain, and l is a time index in the time domain. In some embodiments, k indicates a subcarrier and l or is also referred to as a subcarrier index, and l indicates a symbol and/or is also referred to as a symbol index. For example, a resource element 222 at (10, 1) corresponds to subcarrier 10 and symbol 1. Herein, unless otherwise specified, "symbol" means "PUCCH FMT0 symbol," i.e., a symbol for PUCCH FMT0 signaling.

A predetermined number of consecutive subcarriers in the frequency domain and a predetermined number of consecutive symbols in the time domain form a resource block which is a unit of communications resource allocatable to UEs. Each resource block corresponds to a time slot (herein referred to as "slot") in the time domain. Two slots form a subframe. In some embodiments, a resource block for PUCCH FMT0 signaling includes one or two symbols. In FIG. 2B, the resource grid 221 is an example of a resource block for PUCCH FMT0, and includes 12 subcarriers and 2 symbols. The described specific numbers of subcarriers, symbols, resource blocks, slots, resource elements, or the like, are examples. Other numbers of subcarriers, symbols, resource blocks, slots, resource elements, or the like, are within the scopes of various embodiments.

The received signal Y is distributed among the resource elements of the resource grid 221. The received signal Y in a resource element (k, l) is represented as Y(ant, k, l), where ant is an antenna index corresponding to the antenna where the received signal Y is received. In the example configuration in FIG. 2B, the antenna is antenna Ant_0, the antenna index is zero, and the received signal Y in a resource element (k, l) is represented as (0, k, l). For another antenna, e.g., antenna Ant_1, the received signal Y in a resource element (k, l) is represented as (1, k, l), and so on. The received signal Y in a column of resource elements corresponding to the same symbol is represented with the notation ":" in place of k. For example, in FIG. 2B, Y(0, :, 0) indicates the received signal Y in 12 resource elements corresponding to symbol 0 and all subcarriers from 0 to 11. Similarly, Y(0, :, 1) indicates the received signal Y in 12 resource elements corresponding to symbol 1 and all subcarriers from 0 to 11. In this example, K which is a maximum value for k is 11. Other values of K are within the scopes of various embodiments.

Returning to FIG. 2A, the process 200 comprises operation 201 in which the network device, or at least one processor thereof, is configured to perform grouping of a plurality of terminal devices, or UEs, which are multiplexed on the same communications resource, e.g., the resource block described with respect to FIG. 2B. In at least one embodiment, the grouping is based on PUCCH FMT0 payload types of the multiplexed UEs. For example, in the grouping operation 201, UEs which have the same PUCCH FMT0 payload type among a plurality of PUCCH FMT0 payload types are grouped in the same group. For simplicity, unless otherwise specified, "payload" and "payload type" herein correspondingly mean "PUCCH FMT0 payload" and "PUCCH FMT0 payload type." In at least one embodiment, in the grouping in operation 201, UEs are grouped into the same group if they share the same physical resources (e.g., the same PRB) and have the same payload type.

Examples of payload types include, but are not limited to, the following five payload types. A payload of a first payload type includes Scheduling Request (SR) information only, without any HARQ bits. A payload of a second payload type includes 1 (one) HARQ bit only, without any SR information. A payload of a third payload type includes 2 (two) HARQ bits only, without any SR information. A payload of a fourth payload type includes 1 (one) HARQ bit and SR information. A payload of a fifth payload type includes 2 (two) HARQ bits and SR information. Other payload types are within the scopes of various embodiments. In some embodiments, a payload type of a UE communicating with the network device is preset, or pre-arranged, or pre-informed, or pre-configured between the UE and the network device. As a result, the network device is aware of the payload type to be used by the UE in advance, and is able to place the UE into the correct group. In at least one embodiment, a UE uses different payload types in different communication sessions (or periods, or frames, or the like) with the network device. As a result, the network device dynamically changes the grouping of UEs in response to one or more changes in payload type of one or more UEs in communication with the network device.

The process 200 further comprises operations 202-212 which are performed for each group of UEs obtained from operation 201. Each of operations 202, 203, 204, 207 is performed collectively for UEs in the same group, i.e., for multiplexed UEs which have the same payload type. Each of operations 205-206 and 208-212 is performed individually for each of the UEs in the same group.

At operation 202, a base sequence removal is performed on the received signal Y to obtain a base-sequence-removed signal sequence. In some embodiments, the base sequence removal is performed, using following Equation 1:

$$dePrbsSeq(ant, k, l) = Y(ant, k, l) * conj(\bar{r}_{u,v}(n)). \quad \text{(Equation 1)}$$

In Equation 1, dePrbsSeq(ant, k, l) represents the base-sequence-removed signal sequence obtained after the base sequence removal, ant represents the antenna index of the antenna receiving the received signal, k represents the subcarrier index (or frequency index), l represents the symbol index (or time index), Y(ant, k, l) represents the received signal, conj represents the complex conjugation operator, and $\bar{r}_{u,v}(n)$ represents the base sequence. The base-sequence-removed signal sequence dePrbsSeq is represented using the same indices ant, k, l as the received signal Y. The base sequence is a standard feature, e.g., as described in the 3GPP. "Equation" is abbreviated as "Eq." in FIG. 2A.

FIG. 2B includes an example of a base sequence removal at operation 202, in accordance with some embodiments. In FIG. 2B, the complex conjugate of the base sequence, i.e., $conj(\bar{r}_{u,v}(n))$, is represented as Conj(BaseSeq). In the base sequence removal of the received signal Y, Y(0, :, 0) is multiplied with Conj(BaseSeq) resulting in dePrbsSeq(0, :, 0), Y(0, :, 1) is multiplied with Conj(BaseSeq) resulting in dePrbsSeq(0, :, 1). A combination of dePrbsSeq(0, :, 0), dePrbsSeq(0, :, 1) constitutes the base-sequence-removed signal sequence dePrbsSeq.

Returning to FIG. 2A, at operation 203, an Inverse Discrete Fourier Transform (IDFT) transform is performed on the base-sequence-removed signal sequence dePrbsSeq to obtain a time domain sequence. In some embodiments, the IDFT is performed, using following Equation 2:

$$idftOut(ant, :, l) = idft(dePrbsSeq(ant, :, l)). \qquad \text{(Equation 2)}$$

In Equation 2, ":" represents all values of k from 0 to K, K is a maximum value for k, idftOut(ant, :, 1) represents the time domain sequence for the corresponding antenna at symbol l, and idft represents the IDFT. The described IDFT is an example. Other transforms from the frequency domain to the time domain are within the scopes of various embodiments.

FIG. 2B includes an example of an IDFT at operation 203, in accordance with some embodiments. In FIG. 2B, the IDFT performed on dePrbsSeq(0, :, 0) results in idftOut (0, :, 0), the IDFT performed on dePrbsSeq(0, :, 1) results in idftOut(0, :, 1). A combination of idftOut(0, :, 0), idftOut (0, :, 1), constitutes the time domain sequence idftOut. The time domain sequence idftOut is represented using the same indices ant and l as the received signal Y. However, the frequency index k is no longer represented in the time domain sequence idftOut. Instead of subcarriers, the time domain sequence idftOut includes blocks (or tones) for each symbol. For example, idftOut(0, :, 0) corresponds to symbol 0, and includes 12 consecutive blocks or tones (numbered from 0 to 11). An example block 224 at tone 9, symbol 0, is indicated in FIG. 2B, and corresponds to data idftOut(0,9,0) in the time domain sequence idftOut.

Returning to FIG. 2A, at operation 204, correlation power calculation per antenna and correlation power combination across multiple antennas are performed. In at least one embodiment, correlation power is determined per antenna, using following Equation 3:

$$CorrPower(ant, :, l) = [abs(idftOut(ant, :, l))]^2. \qquad \text{(Equation 3)}$$

In Equation 3, CorrPower(ant, :, 1) represents the correlation power for the corresponding antenna at symbol l. Equation 3 means that correlation power CorrPower is calculated on time domain sequence idftOut by taking the square of the absolute value of all tones in a symbol for each antenna (i.e., for each received signal Y).

FIG. 2B includes an example of the correlation power calculation per antenna at operation 204, in accordance with some embodiments. In FIG. 2B, the square of the absolute value of the data idftOut(0,9,0) in block 224 in the time domain sequence idftOut is determined by Equation 3 to obtain the corresponding correlation power CorrPower(0,9, 0) in corresponding block 225 at tone 9, symbol 0 of the correlation power CorrPower. By Equation 3, idftOut(0, :, 0) in the time domain sequence idftOut results in the corresponding correlation power CorrPower(0, :, 0), idftOut(0, :, 1) results in the corresponding correlation power CorrPower (0, :, 1). A combination of CorrPower(0, :, 0), CorrPower (0, :, 1), constitutes the correlation power CorrPower for the corresponding antenna Ant_0. In some embodiments, the data in the time domain sequence idftOut include complex values, whereas the data in the correlation power CorrPower include real values, due to Equation 3. Other calculations for determining correlation power from the time domain sequence are within the scopes of various embodiments.

In at least one embodiment, correlation power combination across multiple antennas is performed. For example, the correlation power across the plurality of antennas is combined to obtain a plurality of correlation power values, using following Equation 4:

$$\text{(Equation 4)}$$

$$CorrPowerPerTone(:, l) = \left(\frac{1}{numAnt}\right) \sum_{antIdx=1}^{numAnt} CorrPower(ant, :, l).$$

In Equation 4, CorrPowerPerTone(:, 1) represents the combined correlation power across the plurality of antennas at symbol l, numAnt represents a number of antennas in the plurality of antennas, and antIdx represents an antenna index. In at least one embodiment, antIdx corresponds to ant plus 1 (one). CorrPowerPerTone(:, 1) includes, for each symbol, a plurality of correlation power values each being a mean of the corresponding correlation power across antennas of the network device.

FIG. 2C includes an example of the correlation power combination across antennas of the network device at operation 204, in accordance with some embodiments. FIG. 2C includes the correlation power CorrPower for antenna Ant_0 as described with respect to FIG. 2B, and the correlation power CorrPower for antenna Ant_1 which is obtained in a manner similar to that described with respect to antenna Ant_0. For simplicity, it is assumed that the network device includes two antennas, i.e., numAnt=2.

The correlation power CorrPower(0,9,0) in block 225 at tone 9, symbol 0 of CorrPower for antenna Ant_0, and the corresponding correlation power CorrPower(1,9,0) in block 226 at the same location, i.e., tone 9, symbol 0, of Corr-Power for antenna Ant_1 are used to determine a correlation power value CorrPowerPerTone(9,0) in block 227 at the same location, i.e., at tone 9, symbol 0, of CorrPowerPer-Tone. In particular, in accordance with Equation 4, the correlation power value CorrPowerPerTone(9,0) in block 227 is an average of the correlation power CorrPower(0,9,0) in block 225 and the correlation power CorrPower(1,9,0) in block 226. Similarly, averaging the corresponding correla-tion power of CorrPower(0, :, 0) and CorrPower(1, :, 0) results in corresponding correlation power values in Corr-PowerPerTone(:, 0), and averaging the corresponding cor-relation power of CorrPower(0, :, 1) and CorrPower(1, :, 1) results in corresponding correlation power values in Corr-PowerPerTone(:, 1). A combination of the correlation power values in CorrPowerPerTone(:, 0) and CorrPowerPerTone(:, 1) constitutes a plurality of correlation power values com-mon to all UEs in the group, and across antennas of the network device.

In some embodiments where numAnt>2, a corresponding number (higher than two) of correlation power CorrPower will be used in the averaging operation of Equation 4 to obtain one corresponding correlation power value of Corr-PowerPerTone. In at least one embodiment where numAnt=1, the correlation power combination in accor-dance with Equation 4 is omitted, and the CorrPower for the only antenna is used as CorrPowerPerTone.

Returning to FIG. 2A, unlike operations 202-204 which are performed commonly for all terminal devices or UEs in a group, each of operations 205, 206 is performed individually for each UE in the group. Specifically, at operation 205, for each UE in the group, the network device extracts, from the plurality of correlation power values CorrPowerPerTone and based on an initial cyclic shift that is unique to the terminal device, a set of correlation power values corresponding to the terminal device, using following Equations 5-7:

$$tapLoc(m_{cs}, l) = \left( N_{sc}^{RB} - \alpha(m_{cs}, l) \right) \bmod N_{sc}^{RB}, \quad \text{(Equation 5)}$$

$$tapExtractData(m_{cs}, l) = \quad \text{(Equation 6)}$$

$$CorrPowerPerTone(tapLoc(m_{cs}, l), l),$$

$$\text{(Equation 7)}$$

$$tapExtractDataPerHypo(m_{cs}) =$$

$$\left( \frac{1}{numSym} \right) \sum_{symIdx=1}^{numSym} tapExtractData(m_{cs}, l).$$

In Equation 5, $\alpha(m_{cs}, l) = (m_0 + m_{cs} + n_{cs} (n_s, l+l'))$ mod $N_{sc}^{RB}$, $N_{sc}^{RB}$ represents a number of subcarriers per resource block, $m_0$ represents the initial cyclic shift that is unique for the terminal device in question, $m_{cs}$ represents hypothesis indices for the terminal device, $n_{cs}(n_s, l+l')$ represents a cyclic shift value, and $tapLoc(m_{cs}, l)$ represents one or more locations (also referred to as "tap locations") of one or more correlation power values in CorrPowerPerTone to be extracted at symbol/in accordance with $m_{cs}$. In Equation 6, $tapExtractData(m_{cs}, l)$ represents correlation power values extracted at symbol/in accordance with the hypothesis indices $m_{cs}$. In Equation 7, $tapExtractDataPerHypo(m_{cs})$ represents the set of correlation power values in CorrPowerPerTone corresponding to the terminal device, numSym represents a number of symbols in the PUCCH FMT0, and symIdx represents a symbol index. In some embodiments, numSym is one or two.

In some embodiments, the tap locations are determined in accordance with Equation 5, using the initial cyclic shift unique for the terminal device, slot number and symbol number. In at least one embodiment, correlation power values corresponding the output $tapLoc(m_{cs}, l)$ of Equation 5 are extracted, in accordance with Equation 6, from the output CorrPowerPerTone (:, l) of Equation 4. The extraction index is unique for each terminal device based on its initial cyclic shift ($m_0$) parameter configuration for all antennas. In one or more embodiments, the extracted correlation power values $tapExtractData(m_{cs}, l)$ output from Equation 6 are averaged across all symbols in accordance with Equation 7, to obtain a set of correlation power values $tapExtractDataPerHypo(m_{cs})$ corresponding to the terminal device. In at least one embodiment where numSym is one, the averaging operation in accordance with Equation 7 is omitted, and the output of Equation 6 is used as the set of correlation power values corresponding to the terminal device.

FIG. 2C includes an example of the tap location determination in Equation 5, in accordance with some embodiments. In particular, FIG. 2C includes a diagram 229 that shows several examples of hypothesis indices of the terminal device. The diagram 229 includes a circle with 12 indices (or points or locations) numbered from 0 to 11, corresponding to tones 0-11 for each of symbol 0 or symbol 1 of CorrPowerPerTone. In a first example, a first set of hypothesis indices of a terminal device include locations 0, 3, 6, 9 in the diagram 229, meaning that any payload of the terminal device is located at one of the locations 0, 3, 6, 9, whereas the remaining three locations include noise. In a second example, a second set of hypothesis indices of a terminal device include locations 1, 4, 7, 10 in the diagram 229. In a third example, a third set of hypothesis indices of a terminal device include locations 2, 5, 8, 11 in the diagram 229. The same terminal device may use different sets of hypothesis indices in different symbols. For example, for symbol 0 of CorrPowerPerTone, the terminal device uses the second set of hypothesis indices, i.e., locations/tones 1, 4, 7, 10, to transmit its payload, whereas for symbol 1 of CorrPower-PerTone, the same terminal device uses the third set of hypothesis indices, i.e., locations/tones 2, 5, 8, 11, to transmit its payload. Equation 5 returns or outputs, for each symbol, the corresponding set of locations/tones where the payload of the terminal device is located. Based on the example configuration in the diagram 229 of FIG. 2C, a maximum number of UEs that may be simultaneously multiplexed is 11, in one or more embodiments. In at least one embodiment, the number of UEs that may be simultaneously multiplexed is 2, in view of one or more design and/or performance considerations. Any other number of UEs that may be simultaneously multiplexed is within the scopes of various embodiments.

FIG. 2C further includes an example of the tap extraction of correlation power values in Equation 6, in accordance with some embodiments. For example, Equation 5 returns, for the same terminal device, a set of tap locations/tones 1, 4, 7, 10 in symbol 0, and another set of tap locations/tones 2, 5, 8, 11 in symbol 1. Equation 6 extracts and outputs, from symbol 0 of CorrPowerPerTone, correlation power values in blocks 231, 234, 237, 240 corresponding to the returned tap locations 1, 4, 7, 10. Equation 6 further extracts and outputs, from symbol 1 of CorrPowerPerTone, correlation power values in blocks 252, 255, 258, 261 corresponding to the returned tap locations 2, 5, 8, 11. The correlation power values extracted from blocks 231, 234, 237, 240 of symbol 0 correspond to the correlation power values extracted from blocks 252, 255, 258, 261 of symbol 1.

FIG. 2C further includes an example of the correlation power value averaging in Equation 7, in accordance with some embodiments. For example, Equation 7 calculates a mean of the correlation power value extracted from block 231 and the correlation power value extracted from corresponding block 252, to obtain a corresponding correlation power value 271. Similarly, Equation 7 calculates a mean of the correlation power value extracted from block 234 and the correlation power value extracted from corresponding block 255, to obtain a corresponding correlation power value 272. Equation 7 further calculates a mean of the correlation power value extracted from block 237 and the correlation power value extracted from corresponding block 258, to obtain a corresponding correlation power value 273. Equation 7 also calculates a mean of the correlation power value extracted from block 240 and the correlation power value extracted from corresponding block 261, to obtain a corresponding correlation power value 274. A combination of the correlation power values 271-274 constitutes a set $tapExtractDataPerHypo(m_{cs})$ of correlation power values corresponding to the terminal device at issue. In at least one embodiment where numSym is one, e.g., where symbol 1 is omitted, the averaging operation in accordance with Equation 7 is also omitted, and $tapExtractDataPerHypo(m_{cs})$ includes a set of the correlation power values extracted from blocks 231, 234, 237, 240 of symbol 0.

Returning to FIG. 2A, at operation 206, for each terminal device in the group, the network device determines, based on the set tapExtractDataPerHypo($m_{cs}$) of correlation power values, the maximum correlation power value corresponding to the terminal device, using following Equation 8:

$$\max CorrelationPower = \max(tapExtractDataPerHypo(m_{cs})). \quad \text{(Equation 8)}$$

The network device further determines, for each terminal device in the group, the index corresponding to the maximum correlation power value, using following Equation 9:

$$\text{(Equation 9)}$$
$$\max CorrelationPowerIdx = Idx(\max(tapExtractDataPerHypo(m_{cs}))).$$

In Equation 8, maxCorrelationPower represents the maximum correlation power value corresponding to the terminal device. In Equation 9, Idx represents a function that gives the index corresponding to the maximum correlation power value.

FIG. 2C includes an example of determining the maximum correlation power value and its corresponding index for each terminal device in Equations 8-9, in accordance with some embodiments. For example, a maximum of the correlation power values 271-274 in the set tapExtractData-PerHypo($m_{cs}$) is determined in accordance with Equation 8, as maxCorrelationPower corresponding to the terminal device in question. For example, the correlation power value 271 is determined as MaxCorrelationPower. Equation 9 determines the index maxCorrelationPowerIdx corresponding to MaxCorrelationPower. For example, when the correlation power value 271 is determined as MaxCorrelation-Power, Equation 9 returns the index (e.g., $m_{cs}$) corresponding to block 231 in symbol 0 and block 252 in symbol 1, as described with respect to the diagram 229. In another example, when the correlation power value 272 is determined as MaxCorrelationPower, Equation 9 returns a different index corresponding to block 234 in symbol 0 and block 255 in symbol 1. When the correlation power value 273 is determined as MaxCorrelationPower, Equation 9 returns yet another index corresponding to block 237 in symbol 0 and block 258 in symbol 1. When the correlation power value 274 is determined as MaxCorrelationPower, Equation 9 returns a further index corresponding to block 240 in symbol 0 and block 261 in symbol 1. In other words, Equation 9 returns different indices in response to different ones of the correlation power values 271-274 in the set tapExtractDataPerHypo($m_{cs}$) being determined as maxCorrelationPower by Equation 8.

In some embodiments, the index maxCorrelationPowerIdx (e.g., $m_{cs}$) returned or output by Equation 9 is usable to detect the payload of the terminal device in question. In some embodiments, different $m_{cs}$ values indicate different payloads of the terminal device at issue. In a non-limiting example, when the payload type of the terminal device includes 1 HARQ bit and SR information (e.g., in an SR period), $m_{cs}$ equal to 0 indicates that the HARQ bit is ACK and SR is zero (no scheduling is requested), $m_{cs}$ equal to 3 indicates that the HARQ bit is ACK and SR is one (scheduling is requested), $m_{cs}$ equal to 6 indicates that the HARQ bit is NACK and SR is zero, and $m_{cs}$ equal to 9 indicates that the HARQ bit is NACK and SR is one. Other configurations are within the scopes of various embodiments.

Returning to FIG. 2A, operation 207 is again performed commonly for all terminal devices or UEs in a group. At operation 207, noise power is determined based on correlation power values which have been extracted for the terminal devices in the group and which are other than the maximum correlation power values corresponding to the terminal devices in the group, using following Equation 10:

$$\text{(Equation 10)}$$
$$instNoisePwr = \left( \frac{1}{numNoiseCycShifts * numSym} \right)$$
$$\sum_{symIdx=1}^{numSym} \sum_{noiseTapIdx=1}^{numNoiseCycShifts} CorrPowerPerTone(noiseTapIdx, symIdx).$$

In Equation 10, instNoisePwr represents the noise power, numNoiseCycShifts represents one or more reserved cyclic shifts, and noiseTapIdx represents one or more locations of one or more correlation power values corresponding to noise to be extracted.

In some embodiments, the noise power is calculated based on the noise cyclic shifts. To obtain the noise cyclic shifts for noise power calculation, several hypothesis indices other than the peaks or maximums output by Equation 6 are selected. Noise tap locations are calculated using Equation 5, based on the obtained noise cyclic shifts as an input. The noise power is calculated by summing up, and then averaging, the correlation power (obtained from Equation 4) at the noise tap locations in all symbols.

FIG. 2C includes an example of the noise power estimation in Equation 10, in accordance with some embodiments. For example, referring to the diagram 229, it is assumed that there are two multiplexed UEs, i.e., a first UE and a second UE. For symbol 0, it is further assumed that the first UE has a peak (or maximum) MaxCorrelationPower determined by Equation 8 at location 8 in the diagram 229, and the second UE has a peak (or maximum) MaxCorrelationPower determined by Equation 8 at location 3 in the diagram 229. The peak of the first UE at location 8 indicates that related locations 2, 5, 11 include noise. The peak of the second UE at location 3 indicates that related locations 0, 9, 6 include noise. Thus, when both UEs are considered, locations 0, 2, 5, 6, 9, 11 in the diagram 229 include noise, and are referred to herein as noise tap locations. One or more (represented by numNoiseCycShifts) of noise tap locations 0, 2, 5, 6, 9, 11 is/are selected for noise power estimation in symbol 0.

In some embodiments, the selected noise tap location(s) is/are spaced from, i.e., not immediately adjacent to, the determined peaks, to avoid signal leakage from the peaks which may cause inaccuracies in the noise power estimation. For example, with one of the peaks at location 3, the immediately adjacent noise tap location 2 is not selected. Similarly, with another of the peaks at location 8, the immediately adjacent noise tap location 9 is not selected. One or more of the remaining noise tap locations 0, 5, 6, 11 is/are selected for noise power estimation. For example, noise tap locations 5, 6, 11 are selected. Different numbers of selected noise tap locations and/or different sets of selected noise tap locations are within the scopes of various embodiments.

Assuming the noise tap locations 5, 6, 11 are selected, the correlation power values of CorrPowerPerTone at corresponding blocks 285, 286, 291 in symbol 0 are extracted and averaged, to obtain a first average noise power for symbol 0. A second average noise power for symbol 1 is obtained in a similar manner. An average of the first average noise power and the second average noise power is determined across the symbols 0, 1, to obtain the noise power instNoisePwr, as mathematically expressed in Equation 10. The determined noise power is common to all terminal devices in the same group.

In some embodiments, one or more noise tap locations are determined from Equation 5, except that initial cyclic shift $m_0$ is replaced with a reserved initial cyclic shift that is not used by, or allotted to, any UE among the multiplexed UEs in the group. Then, correlation power values of CorrPowerPerTone at the corresponding blocks are extracted, and averaged across all PUCCH FMT0 symbols, as described herein. Other configurations for selecting or determining noise tap locations are within the scopes of various embodiments.

Returning to FIG. 2A, each of operations 208-212 is again performed individually for each UE in the group. At operation 208, a signal-to-noise ratio (SNR) of each terminal device in the group is determined, using following Equation 11:

$$snr_{dB} = 10 * \log_{10}\left(\frac{maxCorrelationPower}{instNoisePwr}\right). \quad \text{(Equation 11)}$$

In Equation 11, $snr_{dB}$ is the SNR of the terminal device. The SNR is determined using the outputs of Equation 8 and Equation 10.

At operation 209, a payload of each terminal device in the group is detected from the index maxCorrelationPowerIdx obtained from the equation 9, as described herein and/or described in the corresponding TS of 3GPP.

At operation 210, for each UE in the group, the SNR of the UE as obtained at operation 208 is compared with a predetermined discontinuous transmission (DTX) threshold. In some embodiments, the DTX threshold is an SNR level (or SNR value) that corresponds to no signal from an UE being received at a network device. Other thresholds are within the scopes of various embodiments.

At operation 211 (Yes from operation 210), in response to the SNR of the UE being equal to or lower than the predetermined threshold, the network device (or a processor thereof) determines that the received signals (at all antennas of the network device) include no signal from the particular UE in question. In some embodiments, the network device (or a processor thereof) is configured to wait for signaling from the particular UE in question in a next PUCCH FMT0 reception.

At operation 212 (No from operation 210), in response to the SNR of the UE being higher than the predetermined threshold, the network device (or a processor thereof) determines that the received signals (at all antennas of the network device) include signaling from the particular UE in question, and sends the detected payload of the UE (as obtained at operation 209) to at least one higher layer in a protocol stack of the network device, e.g., to one or more of the MAC layer 124, RLC layer 126, PDCP layer 128, or the like.

At the one or more higher layers, the network device is configured to utilize the detected payload of the UE for handling further communications with the UE. For example, when the detected payload includes a NACK which indicates that downlink data previously sent to the UE were not successfully received by the UE, the network device retransmits the downlink data. For another example, when the detected payload includes a NACK which indicates that previously re-transmitted downlink data were not successfully received by the UE and the number of re-transmissions has reached a predetermined limit, the network device stops retransmitting the unsuccessfully re-transmitted downlink data. For yet another example, when the detected payload includes an ACK which indicates that previously transmitted or re-transmitted downlink data were successfully received by the UE, the network device transmits new downlink data. For a further example, when the detected payload includes a scheduling request (SR equal to 1), the network device performs scheduling for the UE. Other actions of the network device and/or the communications system 100 for handling further communications with a UE based on the detected payload of the UE are within the scopes of various embodiments.

As described herein, processing of PUCCH FMT0 signals in accordance with other approaches is performed in the frequency domain. The whole PUCCH FMT0 signal processing at each antenna of the network device, is individually performed for one UE at a time. Assuming that a network device receives PUCCH FMT0 signals from N multiplexed UEs, the same set of PUCCH FMT0 signal processing is performed N times by the network device, per antenna. When the number N of multiplexed UEs increases, processing of PUCCH FMT0 signals at the network device may become highly complex and may consume an excessive amount of time, computing power/resources, or the like. The complexity and/or time/resource consumption of PUCCH FMT0 signal processing in accordance with the other approaches may contribute to one or more further undesirable consequences.

In some embodiments, by processing PUCCH FMT0 signals at a network device in the time domain, rather than in the frequency domain as in other approaches, it is possible to perform one or more operations collectively for multiple multiplexed UEs in the same group. Examples of operations collectively performed for multiple multiplexed UEs in the same group include one or more of operations 202, 203, 204, 207 in the process 200. As a result, the amount of time, computing power/resources, or the like, for processing PUCCH FMT0 signals at each antenna is/are reduced, in one or more embodiments. In at least one embodiment, the reduced complexity and/or time/resource consumption of PUCCH FMT0 signal processing help in increasing network performance, especially when multiple UEs are multiplexed on the same communications resource. For example, in at least one embodiment, because PUCCH FMT0 signal processing may be performed faster and/or with lower resource consumption, it is possible for the network device to direct additional time and/or resources to other tasks, thereby increasing network performance and/or communication service quality. Compared to the other approaches, network efficiency and/or network capacity is/are increased. In some embodiments, the reduced complexity of PUCCH FMT0 signal processing at the network device further helps in better scheduling for multiplexed UEs.

FIG. 3 is a flow chart of a method 300, in accordance with some embodiments. In at least one embodiment, one or more or all operations of the method 300 are performed by at least one processor and/or at a network device corresponding to the base station 112 and/or the network device 120. In some embodiments, one or more operations of the method 300 correspond to one or more operations of the process 200 described with respect to one or more of FIGS. 2A-2C.

At operation 310, a network device receives at least one signal from a group of terminal devices over a PUCCH FMT0. For example, the received signal is received by at least one antenna and corresponding receiver circuitry of the network device.

At operation 320, a processor at the network device, which is coupled to the receiver circuitry, performs processing on the received signal to obtain detected payloads corresponding to the terminal devices in the group. In some embodiments, operation 320 includes one or more of operations 321-328.

At operation 321, the processor performs grouping for a plurality of terminal devices. For example, terminal devices having the same payload type and communications resource are grouped into the same group, as described with respect to operation 201.

At operation 322, the processor obtains a base-sequence-removed signal sequence from the received signal. For example, the processor removes a base sequence from the received signal to obtain the base-sequence-removed signal sequence, as described with respect to operation 202 and/or Equation 1.

At operation 323, the processor performs, on the base-sequence-removed signal sequence, a transform from a frequency domain into a time domain to obtain a time domain sequence. In an example as described with respect to operation 203 and/or Equation 2, the processor performs an IDFT. Other transforms from the frequency domain to the time domain are within the scopes of various embodiments.

At operation 324, the processor determines correlation power from the time domain sequence for each antenna of the network device, for example, as described with respect to operation 204 and/or Equation 3.

At operation 325, the processor combines the correlation power across antennas of the network device, to obtain a plurality of correlation power values, for example, as described with respect to operation 204 and/or Equation 4.

At operation 326, the processor extracts, for each terminal device, from the plurality of correlation power values and based on an initial cyclic shift that is unique to the terminal device, a set of correlation power values corresponding to the terminal device, for example, as described with respect to operation 205 and/or one or more of Equations 5-7.

At operation 327, the processor determines, from the set of correlation power values, a maximum correlation power value corresponding to the terminal device, for example, as described with respect to operation 206 and/or one or more of Equations 8-9.

At operation 328, the processor detects a payload of the terminal device based on an index corresponding to the maximum correlation power value, for example, as described with respect to one or more of operations 206, 209. The detected payload is used at operation 330.

At operation 330, the processor utilizes the detected payload for handling further communications with the corresponding terminal device in the group of terminal devices, for example, as described with respect to one or more of operations 209-212.

In some embodiments, the processor further performs one or more of the following operations. The processor performs noise tap extraction and noise power estimation, for example, as described with respect to operation 207 and/or Equation 10. The processor determines an SNR of each terminal device in the group, for example, as described with respect to operation 208 and/or Equation 11. The processor compares the SNR of each terminal device with a predetermined threshold, for example, as described with respect to operation 210. Depending on a result of the comparison, the processor performs one or more further operations, for example, as described with respect to operations 211, 212. In at least one embodiment, one or more advantages described herein are achievable by the method 300.

The described methods and algorithms include example operations, but they are not necessarily required to be performed in the order shown. Operations may be added, replaced, changed order, and/or eliminated as appropriate, in accordance with the spirit and scope of embodiments of the disclosure. Embodiments that combine different features and/or different embodiments are within the scope of the disclosure and will be apparent to those of ordinary skill in the art after reviewing this disclosure.

Figure 4:
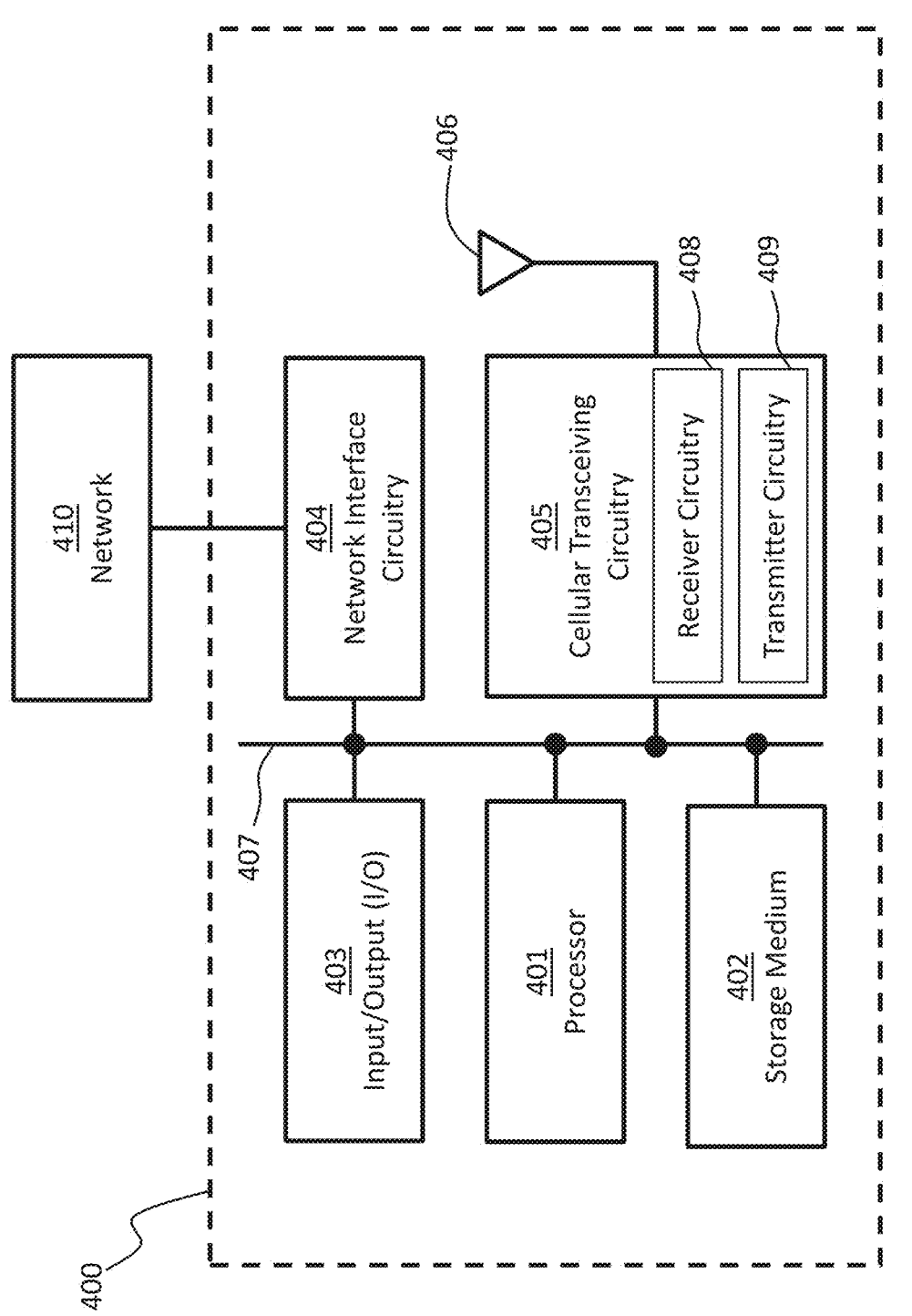
FIG. 4 is a block diagram of an example hardware configuration of equipment in a communications system, in accordance with some embodiments.

FIG. 4 is a block diagram of an example hardware configuration of equipment 400 in a communications system, in accordance with some embodiments. The equipment 400 is configurable to operate as user equipment or a network device, as described herein. The equipment 400 comprises a hardware processor 401, a non-transitory, computer-readable storage medium 402, an input/output (I/O) interface 403, network interface circuitry 404, cellular transceiving circuitry 405 with at least one antenna 406, and a bus 407 which couples the processor 401, the storage medium 402, the I/O interface 403, the network interface circuitry 404, and the cellular transceiving circuitry 405 together. In equipment where cellular communication is not required, the cellular transceiving circuitry 405 and the associated antenna 406 are omitted.

The processor 401 is configured to execute computer program codes encoded in the storage medium 402 in order to cause the equipment 400 to perform a portion or all of the described processes and/or methods. In one or more embodiments, the processor 401 comprises a central processing unit (CPU), a multi-processor, a distributed processing system, an application specific integrated circuit (ASIC), and/or a suitable processing unit.

The storage medium 402, amongst other things, is encoded with, i.e., stores, computer program codes, i.e., a set of executable instructions to be executed by the processor 401, such as one or more algorithms, programs, applications for a system, component, equipment, and/or module, as described with respect to one or more of FIGS. 1A-3. Execution of the sets of instructions by hardware processor 401 implements a portion or all of the processes and/or methods described herein in accordance with one or more embodiments (hereinafter, the noted processes and/or methods). In one or more embodiments, the storage medium 402 comprises an electronic, magnetic, optical, electromagnetic, infrared, and/or a semiconductor system (or apparatus or device). For example, the storage medium 402 includes a semiconductor or solid-state memory, a magnetic tape, a removable computer diskette, a random access memory (RAM), a read-only memory (ROM), a rigid magnetic disk, and/or an optical disk. In one or more embodiments using optical disks, the storage medium 402 includes a compact disk-read only memory (CD-ROM), a compact disk-read/write (CD-R/W), and/or a digital video disc (DVD).

The I/O interface 403 includes an input device, an output device and/or a combined input/output device for enabling a user and/or external circuitry/equipment to interact with equipment 400. An input device comprises, for example, a keyboard, keypad, mouse, trackball, trackpad, touchscreen, and/or cursor direction keys for communicating information and commands to the processor 401. An output device comprises, for example, a display, a printer, a voice synthesizer, etc. for communicating information to a user.

The network interface circuitry 404 is coupled to a network 410 so that the processor 401 and storage medium 402 are capable of connecting to other equipment via the network 410. The network interface circuitry 404 includes wireless network interfaces such as BLUETOOTH, WIFI, WIMAX, GPRS, LTE, 5G, 6G, WCDMA, or the like; or wired network interfaces such as ETHERNET, USB, IEEE-864, or the like. In one or more embodiments, a portion or all of noted processes and/or methods, is implemented in two or more equipment 400 connected over the network 410.

The cellular transceiving circuitry 405 includes receiver circuitry 408 with an associated decoder, and transmitter circuitry 409 with an associated encoder. The receiver circuitry 408 and the transmitter circuitry 409 are coupled to the at least one antenna 406 to correspondingly receive and transmit data through the at least one antenna 406. In some embodiments, the receiver circuitry 408 and the transmitter circuitry 409 are coupled to the same antenna. In one or more embodiments, the receiver circuitry 408 and the transmitter circuitry 409 are coupled to different antennas. The cellular transceiving circuitry 405 is configured to receive and transmit data, using the at least one antenna 406 and the receiver circuitry 408 and/or transmitter circuitry 409, over cellular communication under control of the processor 401. In some embodiments, at least one of the receiver circuitry 408 or the transmitter circuitry 409 comprises one or more of integrated circuits, power amplifier circuitry, low-noise input amplifier circuitry, passive radio frequency (RF) components, other circuitry for handling RF wireless signals, or the like.

In some embodiments, a portion or all of the described processes and/or methods is implemented as a standalone software application for execution by a processor. In some embodiments, a portion or all of the described processes and/or methods is implemented as a software application that is a part of an additional software application. In some embodiments, a portion or all of the described processes and/or methods is implemented as a plug-in to a software application.

In some embodiments, a portion or all of the noted processes and/or methods is realized as functions of a program stored in a non-transitory computer readable recording medium. The non-transitory computer readable recording medium having the program stored therein is a computer program product. Examples of a non-transitory computer-readable recording medium include, but are not limited to, external/removable and/or internal/built-in storage or memory unit, e.g., one or more of an optical disk, such as a DVD, a magnetic disk, such as a hard disk, a semiconductor memory, such as a ROM, a RAM, a memory card, or the like.

In accordance with aspect (1), a network device comprises receiver circuitry configured to receive a signal from a group of terminal devices, the signal received over a physical uplink control channel (PUCCH) Format 0 (FMT0); and a processor coupled to the receiver circuitry. The processor is configured to perform processing on the received signal to detect payloads corresponding to the terminal devices in the group; and utilize the detected payloads for handling further communications with the terminal devices in the group. In the processing, the processor is configured to obtain a time domain sequence from the received signal by performing a transform from a frequency domain into a time domain; determine a plurality of correlation power values from the time domain sequence; and extract, from the plurality of correlation power values, a maximum correlation power value corresponding to each terminal device among the terminal devices in the group.

In accordance with aspect (2), in the network device of aspect (1), the processor is configured to, in the processing, perform grouping of a plurality of terminal devices into a plurality of groups, the plurality of groups includes the group of terminal devices, and each group among the plurality of groups includes terminal devices of a same payload type among a plurality of payload types.

In accordance with aspect (3), in the network device of aspect (2), the plurality of payload types includes: Scheduling Request (SR) information and no hybrid automatic repeat request (HARQ) bits, 1 HARQ bit and no SR information, 2 HARQ bits and no SR information, 1 HARQ bit and SR information, and 2 HARQ bits and SR information.

In accordance with aspect (4), in the network device of any one of aspects (1) to (3), the transform from the frequency domain into the time domain comprises an Inverse Discrete Fourier Transform (IDFT).

In accordance with aspect (5), in the network device of any one of aspects (1) to (4), the processor is configured to, in the processing, determine each correlation power value in the plurality of correlation power values from a corresponding block in the time domain sequence.

In accordance with aspect (6), in the network device of any one of aspects (1) to (5), the processor is configured to, in the processing and for each terminal device in the group, extract, from the plurality of correlation power values and based on an initial cyclic shift that is unique to the terminal device, a set of correlation power values corresponding to the terminal device.

In accordance with aspect (7), in the network device of aspect (6), the processor is configured to, in the processing and for each terminal device in the group, determine a maximum in the set of correlation power values corresponding to the terminal device as the maximum correlation power value corresponding to the terminal device, and detect the payload of the terminal device based on an index corresponding to the maximum correlation power value corresponding to the terminal device.

In accordance with aspect (8), in the network device of aspect (7), the processor is configured to, in the processing, determine noise power, based on correlation power values which have been extracted for the terminal devices in the group and which are other than the maximum correlation power values corresponding to the terminal devices in the group; and determine a signal-to-noise ratio (SNR) of each terminal device in the group, based on the noise power and the maximum correlation power value corresponding to the terminal device.

In accordance with aspect (9), in the network device of aspect (8), the processor is configured to, in the processing and for each terminal device in the group, in response to the SNR of the terminal device being equal to or lower than a predetermined threshold, determine that the received signal includes no signal from the terminal device; and in response to the SNR of the terminal device being higher than the predetermined threshold, send the detected payload of the terminal device to at least one higher layer in a protocol stack of the network device.

In accordance with aspect (10), a non-transitory, tangible computer readable storage medium stores a computer program that, when executed by a processor, causes the processor to perform an Inverse Discrete Fourier Transform (IDFT) transform to obtain a time domain sequence from each received signal among a plurality of received signals, the plurality of signals correspondingly received at a plurality of antennas from a group of terminal devices over a physical uplink control channel (PUCCH) Format 0

(FMT0). The processor is further caused to determine a plurality of correlation power values from the time domain sequence. The processor is further caused to, for each terminal device in the group of terminal devices, extract, from the plurality of correlation power values, a maximum correlation power value corresponding to the terminal device, detect a payload of the terminal device based on an index corresponding to the maximum correlation power value, and utilize the detected payload for handling further communications with the terminal device.

In accordance with aspect (11), in the storage medium of aspect (10), the computer program, when executed by the processor, further causes the processor to perform grouping of a plurality of terminal devices into a plurality of groups, the plurality of groups includes the group of terminal devices, and each group among the plurality of groups includes terminal devices of a same payload type among a plurality of payload types.

In accordance with aspect (12), in the storage medium of any one of aspects (10) and (11), the computer program, when executed by the processor, further causes the processor to remove a base sequence from the received signal to obtain a base-sequence-removed signal sequence, using Equation 1.

In accordance with aspect (13), in the storage medium of aspect (12), the computer program, when executed by the processor, further causes the processor to perform the IDFT on the base-sequence-removed signal sequence to obtain the time domain sequence, using Equation 2.

In accordance with aspect (14), in the storage medium of aspect (13), the computer program, when executed by the processor, further causes the processor to determine correlation power using Equation 3, and combine the correlation power across the plurality of antennas to obtain the plurality of correlation power values using Equation 4.

In accordance with aspect (15), in the storage medium of aspect (14), the computer program, when executed by the processor, further causes the processor to, for each terminal device in the group, extract, from the plurality of correlation power values and based on an initial cyclic shift that is unique to the terminal device, a set of correlation power values corresponding to the terminal device, using Equations 5-7.

In accordance with aspect (16), in the storage medium of aspect (15), the computer program, when executed by the processor, further causes the processor to, for each terminal device in the group, determine, based on the set of correlation power values, the maximum correlation power value corresponding to the terminal device using Equation 8, and determine the index corresponding to the maximum correlation power value, using Equation 9

In accordance with aspect (17), in the storage medium of aspect (16), the computer program, when executed by the processor, further causes the processor to determine noise power, based on correlation power values which have been extracted for the terminal devices in the group and which are other than the maximum correlation power values corresponding to the terminal devices in the group, using Equation 10.

In accordance with aspect (18), in the storage medium of aspect (17), the computer program, when executed by the processor, further causes the processor to, for each terminal device in the group, determine a signal-to-noise ratio (SNR) of the terminal device using Equation 11.

In accordance with aspect (19), in the storage medium of aspect (18), the computer program, when executed by the processor, further causes the processor to, for each terminal device in the group, in response to the SNR of the terminal device being equal to or lower than a predetermined threshold, determine that the received signals include no signal from the terminal device; and in response to the SNR of the terminal device being higher than the predetermined threshold, send the detected payload of the terminal device to at least one higher layer in a protocol stack.

In accordance with aspect (20), a method performed at least in part by a processor comprises: grouping of a plurality of terminal devices into a plurality of groups each including terminal devices of a same payload type among a plurality of payload types of a physical uplink control channel (PUCCH) Format 0 (FMT0); performing a transform from a frequency domain into a time domain to obtain a time domain sequence from each received signal among a plurality of received signals correspondingly received at a plurality of antennas from the group of terminal devices over the PUCCH FMT0; determining correlation power from the time domain sequence corresponding to each antenna among the plurality of antennas; combining the correlation power across the plurality of antennas, to obtain a plurality of correlation power values; and for each terminal device in each group among the plurality of groups, extracting, from the plurality of correlation power values and based on an initial cyclic shift that is unique to the terminal device, a set of correlation power values corresponding to the terminal device, determining, from the set of correlation power values, a maximum correlation power value corresponding to the terminal device, detecting a payload of the terminal device based on an index corresponding to the maximum correlation power value, and utilizing the detected payload for handling further communications with the terminal device.

The foregoing outlines features of several embodiments so that those skilled in the art better understand the aspects of the present disclosure. Those skilled in the art should appreciate that they readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they make various changes, substitutions, and alterations herein without departing from the spirit and scope of the present disclosure.

What is claimed is:

1. A network device, comprising:
receiver circuitry configured to receive a signal from a group of terminal devices, the signal received over a physical uplink control channel (PUCCH) Format 0 (FMT0); and
a processor coupled to the receiver circuitry, and configured to:
perform processing on the received signal to detect payloads corresponding to the terminal devices in the group; and
utilize the detected payloads for handling further communications with the terminal devices in the group,
wherein, in the processing, the processor is configured to:
obtain a time domain sequence from the received signal by performing a transform from a frequency domain into a time domain;
determine a plurality of correlation power values from the time domain sequence; and

23 extract, from the plurality of correlation power values, a maximum correlation power value corresponding to each terminal device among the terminal devices in the group.

2. The network device of claim 1, wherein in the processing, the processor is configured to:

perform grouping of a plurality of terminal devices into a plurality of groups, the plurality of groups includes the group of terminal devices, and each group among the plurality of groups includes terminal devices of a same payload type among a plurality of payload types.

3. The network device of claim 2, wherein the plurality of payload types includes:

Scheduling Request (SR) information and no hybrid automatic repeat request (HARQ) bits, 1 HARQ bit and no SR information, 2 HARQ bits and no SR information, 1 HARQ bit and SR information, and 2 HARQ bits and SR information.

4. The network device of claim 1, wherein the transform from the frequency domain into the time domain comprises an Inverse Discrete Fourier Transform (IDFT).

5. The network device of claim 1, wherein in the processing, the processor is configured to:

determine each correlation power value in the plurality of correlation power values from a corresponding block in the time domain sequence.

6. The network device of claim 1, wherein in the processing and for each terminal device in the group, the processor is configured to:

extract, from the plurality of correlation power values and based on an initial cyclic shift that is unique to the terminal device, a set of correlation power values corresponding to the terminal device.

7. The network device of claim 6, wherein in the processing and for each terminal device in the group, the processor is configured to:

determine a maximum in the set of correlation power values corresponding to the terminal device as the maximum correlation power value corresponding to the terminal device, and detect the payload of the terminal device based on an index corresponding to the maximum correlation power value corresponding to the terminal device.

8. The network device of claim 7, wherein in the processing, the processor is configured to:

determine noise power, based on correlation power values which have been extracted for the terminal devices in the group and which are other than the maximum correlation power values corresponding to the terminal devices in the group; and determine a signal-to-noise ratio (SNR) of each terminal device in the group, based on the noise power and the maximum correlation power value corresponding to the terminal device.

9. The network device of claim 8, wherein in the processing and for each terminal device in the group, the processor is configured to:

in response to the SNR of the terminal device being equal to or lower than a predetermined threshold, determine that the received signal includes no signal from the terminal device; and in response to the SNR of the terminal device being higher than the predetermined threshold, send the detected payload of the terminal device to at least one higher layer in a protocol stack of the network device.

10. A non-transitory, tangible computer readable storage medium storing a computer program that, when executed by a processor, causes the processor to:

perform an Inverse Discrete Fourier Transform (IDFT) transform to obtain a time domain sequence from each received signal among a plurality of received signals, the plurality of signals correspondingly received at a plurality of antennas from a group of terminal devices over a physical uplink control channel (PUCCH) Format 0 (FMT0);

determine a plurality of correlation power values from the time domain sequence; and for each terminal device in the group of terminal devices, extract, from the plurality of correlation power values, a maximum correlation power value corresponding to the terminal device, detect a payload of the terminal device based on an index corresponding to the maximum correlation power value, and utilize the detected payload for handling further communications with the terminal device.

11. The storage medium of claim 10, wherein the computer program, when executed by the processor, further causes the processor to:

perform grouping of a plurality of terminal devices into a plurality of groups, the plurality of groups includes the group of terminal devices, and each group among the plurality of groups includes terminal devices of a same payload type among a plurality of payload types.

12. The storage medium of claim 10, wherein the computer program, when executed by the processor, further causes the processor to:

remove a base sequence from the received signal to obtain a base-sequence-removed signal sequence, using following Equation 1:

$$dePrbsSeq(ant, k, l) = Y(ant, k, l) * conj(\bar{r}_{u,v}(n)) \qquad \text{(Equation 1)}$$

where dePrbsSeq(ant, k, l) represents the base-sequence-removed signal sequence, ant represents an antenna index of a corresponding antenna receiving the received signal, k represents a subcarrier index, l represents a symbol index, Y(ant, k, l) represents the received signal, conj represents a complex conjugation operator, and $\bar{r}_{u,v}(n)$ represents the base sequence.

13. The storage medium of claim 12, wherein the computer program, when executed by the processor, further causes the processor to:

perform the IDFT on the base-sequence-removed signal sequence to obtain the time domain sequence, using following Equation 2:

$$idftOut(ant, :, l) = idft(dePrbsSeq(ant, :, l)), \qquad \text{(Equation 2)}$$

where
"∶" includes all values of k from 0 to K, and K represents a maximum value for k,
idftOut(ant, ∶, l) represents the time domain sequence for the corresponding antenna at symbol l, and
idft represents the IDFT.

14. The storage medium of claim 13, wherein the computer program, when executed by the processor, further causes the processor to:

determine correlation power, using following Equation 3:

$$\text{Corr}Power(ant, \, \colon, \, l) = [\text{abs}(idftOut(ant, \, \colon, \, l))]^2, \quad \text{(Equation 3)}$$

and
combine the correlation power across the plurality of antennas to obtain the plurality of correlation power values, using following Equation 4:

$$\text{(Equation 4)}$$

$$\text{Corr}PowerPerTone(\colon, \, l) = \left(\frac{1}{numAnt}\right) \sum\nolimits_{antIdx=1}^{numAnt} \text{Corr}Power(ant, \, \colon, \, l),$$

where
CorrPower(ant, ∶, l) represents the correlation power for the corresponding antenna at symbol l,
CorrPowerPerTone(∶, l) represents the combined correlation power across the plurality of antennas at symbol l,
numAnt represents a number of antennas in the plurality of antennas, and
antIdx represents an antenna index.

15. The storage medium of claim 14, wherein the computer program, when executed by the processor, further causes the processor to, for each terminal device in the group:

extract, from the plurality of correlation power values and based on an initial cyclic shift that is unique to the terminal device, a set of correlation power values corresponding to the terminal device, using following Equations 5-7:

$$tapLoc(m_{cs}, l) = \left(N_{sc}^{RB} - \alpha(m_{cs}, l)\right) \bmod N_{sc}^{RB}, \quad \text{(Equation 5)}$$

$$tapExtractData(m_{cs}, l) = \quad \text{(Equation 6)}$$

$$\text{Corr}PowerPerTone(tapLoc(m_{cs}, l), l), \quad \text{(Equation 7)}$$

$$tapExtractDataPerHypo(m_{cs}) =$$

$$\left(\frac{1}{numSym}\right) \sum\nolimits_{symIdx=1}^{numSym} tapExtractData(m_{cs}, l),$$

where $$\alpha(m_{cs}, l) = (m_0 + m_{cs} + n_{cs}(n_{cs}, l + l')) \bmod N_{sc}^{RB},$$

$N_{sc}^{RB}$ represents a number of subcarriers per resource block,
$m_0$ represents the initial cyclic shift that is unique for the terminal device,

$m_{cs}$ represents hypothesis indices for the terminal device,
$n_{cs}(n_s, l+l')$ represents a cyclic shift value,
tapLoc($m_{cs}$, l) represents one or more locations of one or more correlation power values to be extracted at symbol l in accordance with $m_{cs}$,
tapExtractData($m_{cs}$, l) represents correlation power values extracted at symbol l in accordance with the hypothesis indices $m_{cs}$,
tapExtractDataPerHypo($m_{cs}$) represents the set of correlation power values corresponding to the terminal device,
numSym represents a number of symbols in the PUCCH FMT0, and
symIdx represents a symbol index.

16. The storage medium of claim 15, wherein the computer program, when executed by the processor, further causes the processor to, for each terminal device in the group:

determine, based on the set of correlation power values, the maximum correlation power value corresponding to the terminal device, using following Equation 8:

$$\text{max}CorrelationPower = \text{max}(tapExtractDataHypo(m_{cs})), \quad \text{(Equation 8)}$$

and
determine the index corresponding to the maximum correlation power value, using following Equation 9:

$$\text{(Equation 9)}$$

$$\text{max}CorrelationPowerIdx = Idx(\text{max}(tapExtractDataPerHypo(m_{cs}))),$$

where
maxCorrelationPower represents the maximum correlation power value corresponding to the terminal device, and
Idx represents a function that gives the index corresponding to the maximum correlation power value.

17. The storage medium of claim 16, wherein the computer program, when executed by the processor, further causes the processor to:

determine noise power, based on correlation power values which have been extracted for the terminal devices in the group and which are other than the maximum correlation power values corresponding to the terminal devices in the group, using following Equation 10:

$$\text{(Equation 10)}$$

$$instNoisePwr = \left(\frac{1}{numNoiseCycShifts * numSym}\right)$$

$$\sum_{symIdx=1}^{numSym} \sum_{noiseTapIdx=1}^{numNoiseCycShifts} \text{Corr}PowerPerTone(noiseTapIdx, symIdx),$$

where
instNoisePwr represents the noise power,
numNoiseCycShifts represents one or more reserved cyclic shifts, and noiseTapIdx represents one or more locations of one or more correlation power values corresponding to noise to be extracted.

18. The storage medium of claim 17, wherein the computer program, when executed by the processor, further causes the processor to, for each terminal device in the group:

determine a signal-to-noise ratio (SNR) of the terminal device, using following Equation 11:

$$snr_{dB} = 10 * \log_{10}\left(\frac{maxCorrelationPower}{instNoisePwr}\right), \quad \text{(Equation 11)}$$

where $snr_{dB}$ is the SNR of the terminal device.

19. The storage medium of claim 18, wherein the computer program, when executed by the processor, further causes the processor to, for each terminal device in the group:

in response to the SNR of the terminal device being equal to or lower than a predetermined threshold, determine that the received signals include no signal from the terminal device; and in response to the SNR of the terminal device being higher than the predetermined threshold, send the detected payload of the terminal device to at least one higher layer in a protocol stack.

20. A method performed at least in part by a processor, the method comprising:

grouping of a plurality of terminal devices into a plurality of groups each including terminal devices of a same payload type among a plurality of payload types of a physical uplink control channel (PUCCH) Format 0 (FMT0);

performing a transform from a frequency domain into a time domain to obtain a time domain sequence from each received signal among a plurality of received signals correspondingly received at a plurality of antennas from the group of terminal devices over the PUCCH FMT0;

determining correlation power from the time domain sequence corresponding to each antenna among the plurality of antennas;

combining the correlation power across the plurality of antennas, to obtain a plurality of correlation power values; and for each terminal device in each group among the plurality of groups, extracting, from the plurality of correlation power values and based on an initial cyclic shift that is unique to the terminal device, a set of correlation power values corresponding to the terminal device, determining, from the set of correlation power values, a maximum correlation power value corresponding to the terminal device, detecting a payload of the terminal device based on an index corresponding to the maximum correlation power value, and utilizing the detected payload for handling further communications with the terminal device.

* * * * *